(No Model.)
D. V. THRIFT.
ANIMAL TRAP.
No. 413,877. Patented Oct. 29, 1889.
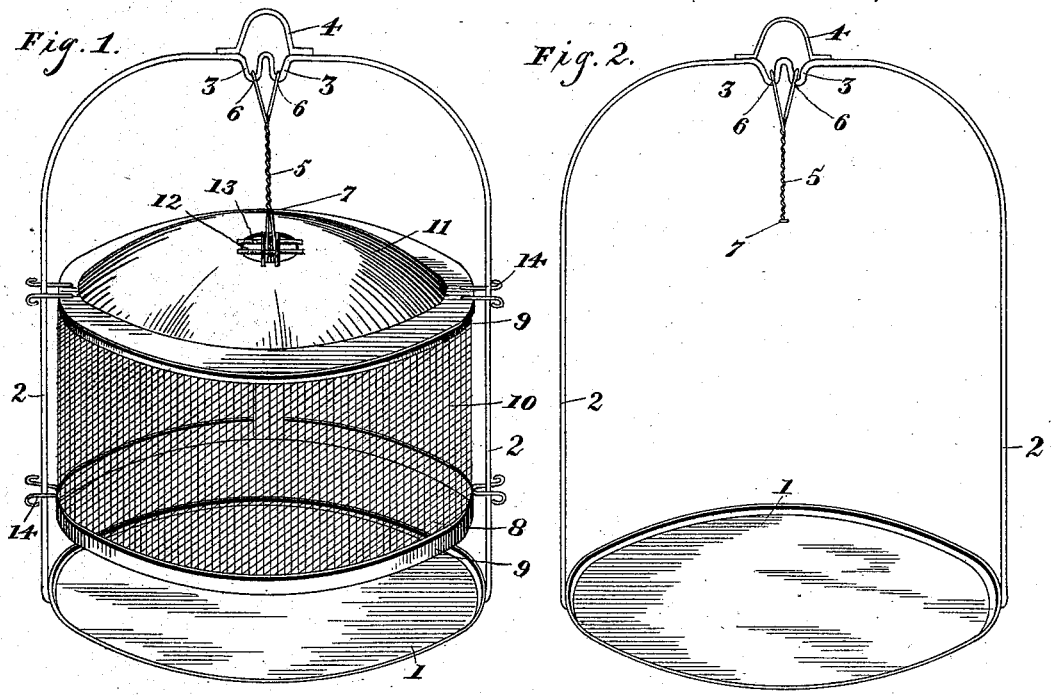
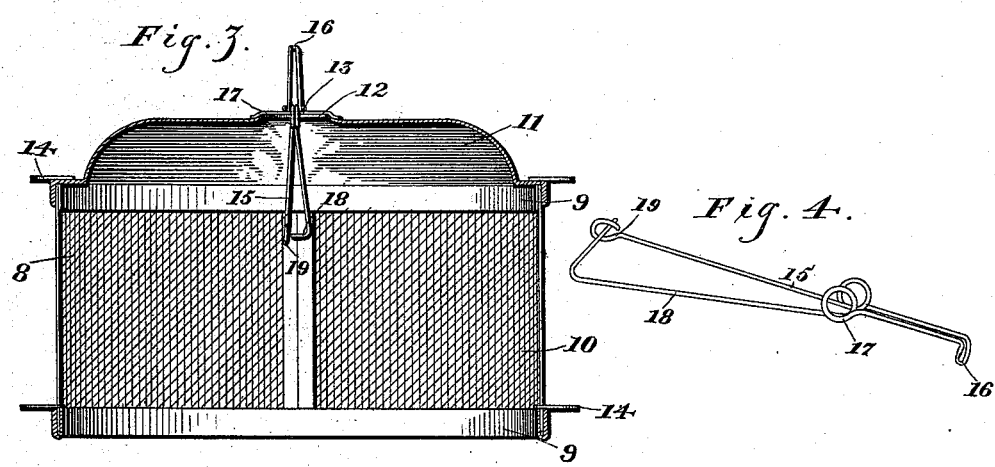
Witnesses:
J. M. Witherow
W. R. Duval
Inventor
David V. Thrift
By his Attorneys,
C. A. Snow & Co.
N. PETERS, Photo-Lithographer, Washington, D. C.

UNITED STATES PATENT OFFICE.

DAVID VANCE THRIFT, OF NEVADA, IOWA.

ANIMAL-TRAP.

SPECIFICATION forming part of Letters Patent No. 413,877, dated October 29, 1889.

Application filed July 17, 1889. Serial No. 317,773. (No model.)

*To all whom it may concern:*

Be it known that I, DAVID VANCE THRIFT, a citizen of the United States, residing at Nevada, in the county of Story and State of Iowa, have invented a new and useful Trap, of which the following is a specification.

This invention has relation to traps for capturing small animals, such as rats, mice, gophers, rabbits, &c.; and among the objects in view are to provide a simple and effective trap of such an appearance as not to cause alarm to the animals, the bait mechanism of which is so constructed as to obviate any liability of the animal withdrawing the bait therefrom without operating the trap.

With these general objects in view the invention consists in forming the trap of metal, whereby the same is prevented from becoming scented by the previous occupancy of animals, in forming a metal base and a U-shaped bail having suspended at its middle a pivoted tongue, and in mounting upon the base and for sliding vertically between the arms of the bail a perforated cylinder, the dome of which is provided with the bait-receiving trigger; and, furthermore, in certain features of construction, hereinafter specified, and particularly pointed out in the claims.

Referring to the drawings, Figure 1 is a perspective of the trap constructed in accordance with my invention and in a set position. Fig. 2 is a similar view of the bait-pan or base; Fig. 3, a transverse section of the cage; Fig. 4, a detail in perspective of the bait-trigger.

Like numerals of reference indicate like parts in all the figures of the drawings.

1 represents a preferably circular sheet-metal base, from diametrically-opposite sides of which rises an inverted-U-shaped bail 2, the central portion of which is downwardly bent to form opposite loops 3, over which is mounted a finger or suspension ring 4.

5 represents a pivoted tongue, which is composed of a single piece of wire bent and twisted upon itself, the ends of which form eyes 6, which engage the loops. The lower end of the tongue is bent at a right angle, as at 7.

8 represents a preferably cylindrical cage, and the same consists of a side frame formed of sheet-metal strips 9 and connected by mesh wire 10, the upper portion of the cage being provided with a dome 11, having a central opening 12, across which extends a series of wires 13, to prevent the escape of the captured animal. The cage is maintained in position upon the base and adapted to move vertically between the opposite arms of the bail by means of small U-clips 14, secured at diametrically-opposite points of the dome and at the lower edge of the cage, said clips loosely embracing the opposite arms of the bail. The bail is preferably made of spring-wire, so that the arms thereof may be sprung apart to permit of the insertion and withdrawal of the cage for cleaning purposes.

Upon one of the wires 13 is loosely mounted the bait-trigger 15, and the same consists of, in this instance, a single piece of wire bent upon itself to form a foot 16 to engage the foot of the pivoted tongue, and afterward continued to form opposite loops or eyes 17, which receive the wire 13; and from thence one terminal is bent to form a hook 18 for the reception of the bait, and the opposite terminal extends to the forward end of the hook and terminates in an eye, as at 19, which serves to take over the hook and prevent the animal from withdrawing the bait without springing the trap.

The operation of my invention will be readily apparent, and may be briefly stated as follows: A bait is placed upon the trigger and the cage elevated until the feet of the trigger and tongue engage, when the trap is set. It is apparent that any movement at the lower end of the trigger, as caused by an animal attempting to secure the bait, will result in a disengagement of the two feet and the cage will fall by gravity.

It is evident that by forming the trap entirely of sheet metal and in the manner specified, whereby the parts may be disconnected, the same may be readily cleaned and the scent of animals previously caught will not remain in the same. Furthermore, by forming the trap without any dark or suspicious-looking openings, the animals will be caused to enter more readily and are less suspicious.

Having thus described my invention, what I claim is—

1. In a trap, a trigger formed of a single piece of wire bent upon itself and intermediate its ends to form a supporting-eye, and one of said ends terminating in a hook and the opposite end in a spring bait-retaining bar, substantially as specified.

2. The base 1 and the inverted-U-shaped bail 2, comprising opposite vertical arms, and bent at its center to form opposite depending loops 3, in combination with the cage 8, mounted upon the base and having diametrically and vertically opposite clips 14, adapted to embrace the arms 2, an opening formed in the top of the case and a cross-bar located thereover, and the herein-described trigger formed of a single piece of wire doubled and bent to form a foot and coiled to form opposite eyes 17 for the reception of the cross-bar, and having one terminal bent to form an eye 19, and a bait-arm 18, adapted to enter the eye, and the pivoted tongue formed of a single piece of wire bent upon itself and twisted and terminating in a foot engaging hook 7, and diverged at its opposite end to form eyes engaging the eyes and loops 3, substantially as specified.

In testimony that I claim the foregoing as my own I have hereto affixed my signature in presence of two witnesses.

DAVID VANCE THRIFT.

Witnesses:
J. A. MILLS,
C. G. McCARTHY.